Patented Oct. 12, 1954

2,691,676

UNITED STATES PATENT OFFICE 2,691,676

N,N-di-(n - OCTYL) - N -METHYL- N - (3,4 - DI-CHLOROBENZYL) AMMONIUM CHLORIDE AND PROCESS FOR PREPARING THE SAME

Louis L. Hallock, Terre Haute, Ind., assignor to Sterling Drug Inc., New York, N. Y., a corporation of Delaware No Drawing. Application June 2, 1952,
Serial No. 291,299

2 Claims. (Cl. 260—567.6)

This invention relates to N,N-di-(n-octyl)-N-methyl - N - (3,4 - dichlorobenzyl) ammonium chloride and to the preparation of the same.

I have discovered that N,N-di-(n-octyl)-N-methyl - N - (3,4 - dichlorobenzyl) ammonium chloride is highly useful as an antifungal agent and also exhibits useful antibacterial properties.

The preparation of my new compound can be carried out conveniently by treating N-methyl-di-n-octylamine with 3,4-dichlorobenzyl chloride. This reaction is represented by the following equation:

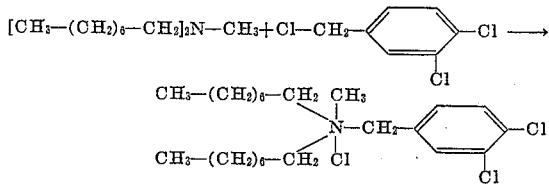

Advantageously, this reaction is carried out by heating approximately equimolecular proportions of the two reactants together at 40–100° C. If desired, the condensation product thus obtained can be submitted to purification procedures.

My invention is illustrated by the following example without, however, being limited thereto.

Example

A mixture of 25.5 g. of N-methyl-di-n-octylamine and 19.5 g. of 3,4-dichlorobenzyl chloride was heated on a steam bath for about sixteen hours. The solid reaction product thus obtained was dissolved in boiling acetone and the resulting solution was refrigerated. The solid product which separated from the chilled solution was collected on a filter and was then again recrystallized from acetone. The product thus obtained, which was N,N-di-(n-octyl)-N-methyl-N-(3,4-dichlorobenzyl) ammonium chloride, was dried at 100° C. at 5 mm. The product weighed 23.0 g. and melted at 118–120° C. The water solubility of the compound was below 0.25%; it was soluble in 95% ethanol to the extent of 1%.

N,N - di - (n - octyl) - N - methyl - N - (3,4-dichlorobenzyl) ammonium chloride was found to have high activity against bacteria and fungi, for example, *Streptococcus hemolyticus*, *Staphylococcus*, *aureus*, *Eberthella typhi*, *Mycobacterium tuberculosis*, *Clostridium welchii*, *Trichophyton interdigitale*, *Trichophyton mentagrophytes*, *Trichophyton gypseum*, and *Monilia albicans*.

I claim:

1. N,N - di - (n - octyl) - N - methyl - N - (3,4-dichlorobenzyl) ammonium chloride, having the formula

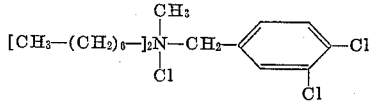

2. The process which comprises interacting N-methyl-di-n-octylamine and 3,4-dichlorobenzyl chloride.

References Cited in the file of this patent

FOREIGN PATENTS

| Number | Country | Date |
|--------|---------|------|
| 458,033 | Great Britain | Dec. 8, 1936 |

OTHER REFERENCES

Kuhn, "Ber. deut. chem.," vol. 73 (1940), pp. 1095 to 1100.

Waklin, "Mfg. Chemist," vol. 10 (1939), pp. 17 and 18.

Winternitz et al., "Bull. Soc. Chim. Biol.," vol. 33 (1951), pp. 376, 377 and 381.

Lawrence et al., "J. Am. Pharm. Assn.," November 1947, vol. 36, pp. 350–358.